US010223218B2

United States Patent
Cors et al.

(10) Patent No.: US 10,223,218 B2
(45) Date of Patent: Mar. 5, 2019

(54) DISASTER RECOVERY OF MANAGED SYSTEMS

(71) Applicant: International Business Machines Corporation, Armonk, NY (US)

(72) Inventors: Josep Cors, Rochester, MN (US); Richard E. Harper, Chapel Hill, NC (US); Naresh Nayar, Rochester, MN (US); Gerhard A. Widmayer, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 15/363,682

(22) Filed: Nov. 29, 2016

(65) Prior Publication Data

US 2018/0150365 A1     May 31, 2018

(51) Int. Cl.
    *G06F 11/20*       (2006.01)
(52) U.S. Cl.
    CPC ........ *G06F 11/203* (2013.01); *G06F 11/2025* (2013.01); *G06F 2201/815* (2013.01)
(58) Field of Classification Search
    CPC ............... G06F 9/45533; G06F 9/5077; G06F 11/2025; G06F 2201/815
See application file for complete search history.

(56) References Cited

U.S. PATENT DOCUMENTS

| 7,093,086 | B1 | 8/2006 | Van Rietschote | |
| 8,621,274 | B1 * | 12/2013 | Forgette | G06F 11/203 |
| | | | | 711/154 |
| 8,707,301 | B2 * | 4/2014 | Fries | G06F 8/61 |
| | | | | 709/220 |
| 8,977,886 | B2 * | 3/2015 | Bauer | H04L 67/1097 |
| | | | | 714/4.1 |
| 9,176,829 | B2 * | 11/2015 | Jain | G06F 11/1484 |
| 9,417,976 | B2 * | 8/2016 | Sugabrahmam | G06F 11/1471 |
| 2011/0258481 | A1 * | 10/2011 | Kern | G06F 11/1484 |
| | | | | 714/4.1 |
| 2013/0111262 | A1 | 5/2013 | Taylor et al. | |
| 2015/0234713 | A1 * | 8/2015 | Shimada | G06F 11/1451 |
| | | | | 714/19 |
| 2016/0239396 | A1 | 8/2016 | Deng et al. | |
| 2016/0335109 | A1 * | 11/2016 | Ryu | G06F 9/45558 |

* cited by examiner

*Primary Examiner* — Joseph R Kudirka
(74) *Attorney, Agent, or Firm* — Francis Lammes; Steven J. Walder, Jr.; David B. Woycechowsky

(57) ABSTRACT

A mechanism is provided for disaster recovery of managed systems. Responsive to an identification of a virtual machine recovery condition occurring at a first node site, one or more virtual machines to be recovered to a second site node are identified. Further responsive to the identification of the virtual machine recovery condition occurring at the first node site and responsive to the identification of the one or more virtual machines to be recovered, at least some of records/metadata state data associated with the one or more virtual machines are transmitted to the second site node.

20 Claims, 5 Drawing Sheets

DISASTER RECOVERY OF MANAGED SYSTEMS

BACKGROUND

The present application relates generally to an improved data processing apparatus and method and more specifically to mechanisms for disaster recovery of managed systems.

In computing, a virtual machine (VM) is an emulation of a computer system. Virtual machines are based on computer architectures and provide at least some of the functionality of a typical physical computer. The implementation of VMs may involve specialized hardware, software, or a combination of hardware and software. There are different kinds of virtual machines, each with different functions. System virtual machines (also sometimes called full virtualization VMs) provide a substitute for a real machine. System virtual machines provide functionality needed to execute entire operating systems. Typically, a hypervisor uses native execution to share and manage hardware, allowing for multiple environments which are isolated from one another, but which exist on the same physical machine. Process virtual machines execute computer programs in a platform-independent environment. Other types of VMs emulate different architectures and allow execution of software applications and operating systems written for another CPU or architecture. Operating-system-level virtualization allows the resources of a computer to be partitioned via the kernel's support for multiple isolated user space instances (that is, containers) and may look and feel like real machines to the end users.

Disaster recovery (DR) refers to a set of policies and procedures to enable the recovery and/or continuation of vital technology infrastructure and systems following a natural or human-caused disaster. Disaster recovery focuses on information technology (IT) or technology systems supporting critical business functions. During the 1980s and 90s, customer awareness and industry both grew rapidly, driven by the advent of open systems and real-time processing which increased the dependence of organizations on their IT systems. Regulations mandating business continuity and disaster recovery plans for organizations in various sectors of the economy, imposed by the governmental and/or private businesses, led to the availability of commercial disaster recovery services. With the rapid growth of the computerized communication networks, organizations of all sizes became further dependent on the continuous availability of their IT systems, with some organizations setting objectives of over 99 percent availability of critical systems. Modern DR includes technology such as high-availability solutions and hot-site facilities. Under current DR technology, critical IT services can be served remotely, hence on-site recovery became less important. Increased use of cloud computing continues that trend. Now, it typically matters less where computing services are physically served, just so long as the network itself is sufficiently reliable. "Recovery as a Service" (RaaS) is one of the security features or benefits of cloud computing being promoted by the Cloud Security Alliance.

The cloud is a network of computers that store and process information, where the resources, such as hardware, software, memory, or the like, are shared by multiple organization and/or individuals. The services provided in the cloud may be unmanaged or managed. In an unmanaged cloud, the customer rents access to infrastructure and takes on all the burden of managing that infrastructure, as well as all the tools and applications that run on top of the infrastructure. In a managed cloud, at the infrastructure level, for the services of the managed cloud that the customer subscribes to, the customer is provided with, for example:

- architecture guidance,
- system administration and operations,
- system monitoring, alerting, and reporting,
- performance testing and tuning,
- proactive communications and 24×7 support,
- a single point of contact for support,
- Domain Name System (DNS) management,
- security and compliance management,
- backup and disaster recovery,
- database administration, and/or
- developer support and training.

In a managed cloud, at the applications and tools level, for the services of the managed cloud that the customer subscribes to, the customer is provided with, for example:

- development and operations automation tools,
- application deployment, scaling, and lifecycle management,
- specialized database management,
- managed virtualization,
- management of applications,
- private cloud deployment and management, and/or
- digital marketing platform management.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for disaster recovery of managed systems. The illustrative embodiment identifies one or more virtual machines to be recovered to a second site node in response to an identification of a virtual machine recovery condition occurring at a first node site. The illustrative embodiment transmits at least some of records/metadata state data associated with the one or more virtual machines to the second site node in further response to the identification of the virtual machine recovery condition occurring at the first node site and in response to the identification of the one or more virtual machines to be recovered.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
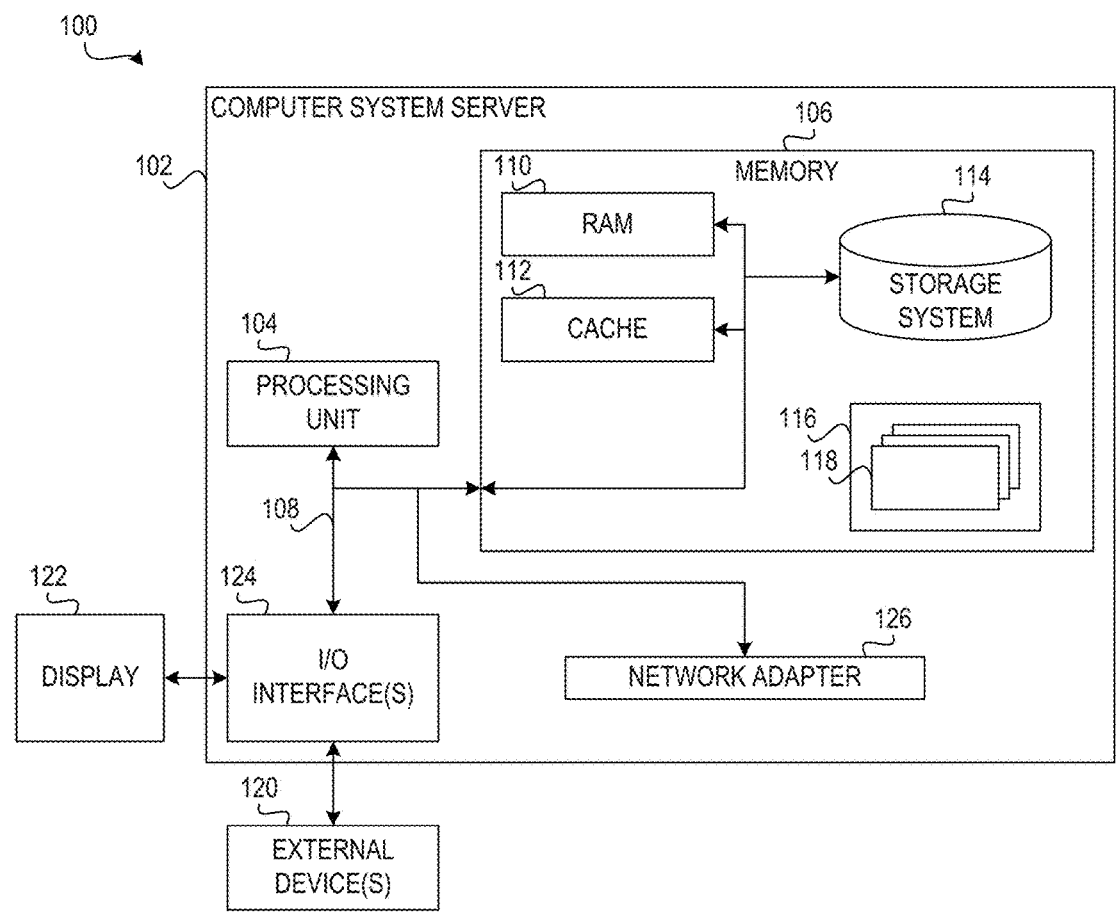
FIG. 1 depicts a cloud computing node according to an illustrative embodiment.

The illustrative embodiments provide mechanisms for disaster recovery of managed systems. As noted above, a managed cloud provides support of services subscribed to by a customer both at an infrastructure level as well as an applications and tools level. For the services of the managed cloud that the customer subscribes to, i.e. managed cloud services, it is essential and often legally required that the management services are provided to a managed workload after the managed workload has been relocated to a Disaster Recovery (DR) site in the event of a disaster. Such services include security scanning, patching, monitoring, backup/restore, billing, or the like, which would also be disabled at the time of the disaster since those management services are typically located at the same site as the managed workload. However, when a managed workload has been transferred to a DR site, placing the managed workload under management at the DR site is not inconsequential because systems management tools (1) contain a large amount of state information that describes the managed workload and that state information is not simply replicated to another set of management tools, (2) any management tools running at the DR site are unaware of the managed workload that has been failed over to the DR site, and (3) integration of management of a new workload into the systems management tools management may be extremely difficult to integrate when the systems management tools is already managing other workloads.

The illustrative embodiments provide a disaster recovery of managed systems solution that does not require pre-disaster provisioning. The managed systems disaster recovery mechanisms integrate a workload that has been replicated to the DR site into the management tools at that DR site at the time of recovery. By integrating the workload into the management tools at that DR site at the time of recovery, a cost advantage is achieved by not having to pre-provision manageable workload at the DR site prior to the disaster, management tool state data does not have to be replicated from the primary site to the DR site prior to the disaster, and full manageability of the failed-over workload at time of disaster is established. Additionally, by integrating the workload into the management tools at that DR site at the time of recovery, the managed systems disaster recovery mechanisms provide for the management tools on the primary site and the DR site to be different, i.e. different products, different technologies, or the like, as well as providing for the DR site management tools to be a subset of the management tools on the primary site.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 102 in cloud computing node 100 is shown in the form of a general-purpose computing device. The components of computer system/server 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 102 typically includes a variety of computer system readable media. Such media may be any available media that is accessible by computer system/server 102, and it includes both volatile and non-volatile media, removable and non-removable media.

System memory 106 can include computer system readable media in the form of volatile memory, such as random access memory (RAM) 110 and/or cache memory 112. Computer system/server 102 may further include other removable/non-removable, volatile/non-volatile computer system storage media. By way of example only, storage system 114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 106 may include at least one program product having a set (e.g., at least one) of program modules that are configured to carry out the functions of embodiments of the invention.

Program/utility 116, having a set (at least one) of program modules 118, may be stored in memory 106 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 102 may also communicate with one or more external devices 120 such as a keyboard, a pointing device, a display 122, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 124. Still yet, computer system/server 102 can communicate with one or more networks such as a local area network (LAN), a general wide area network (WAN), and/or a public network (e.g., the Internet) via network adapter 126. As depicted, network adapter 126 communicates with the other components of computer system/server 102 via bus 108. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

Figure 2:
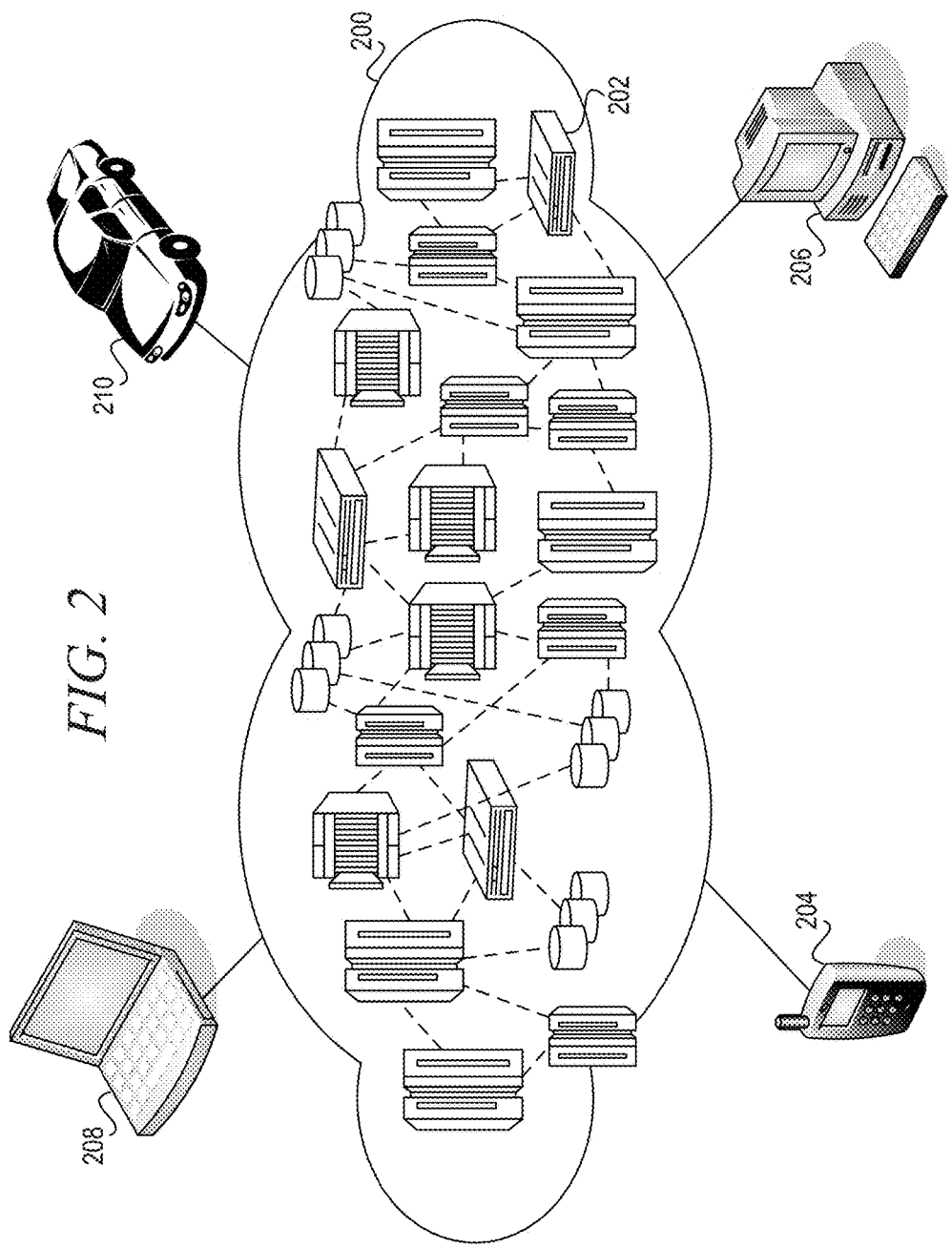
FIG. 2 depicts a cloud computing environment according an illustrative embodiment.

Referring now to FIG. 2, illustrative cloud computing environment 200 is depicted. As shown, cloud computing environment 200 comprises one or more cloud computing nodes 202, such as cloud computing node 100 of FIG. 1, with which local computing devices used by cloud consumers, such as, for example, personal digital assistant (PDA) or cellular telephone 204, desktop computer 206, laptop computer 208, and/or automobile computer system 210 may communicate. Nodes 202 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 204-210 shown in FIG. 2 are intended to be illustrative only and that computing nodes 202 and cloud computing environment 200 can communicate with any type of computerized device over any type of network and/or network addressable connection (e.g., using a web browser).

Figure 3:
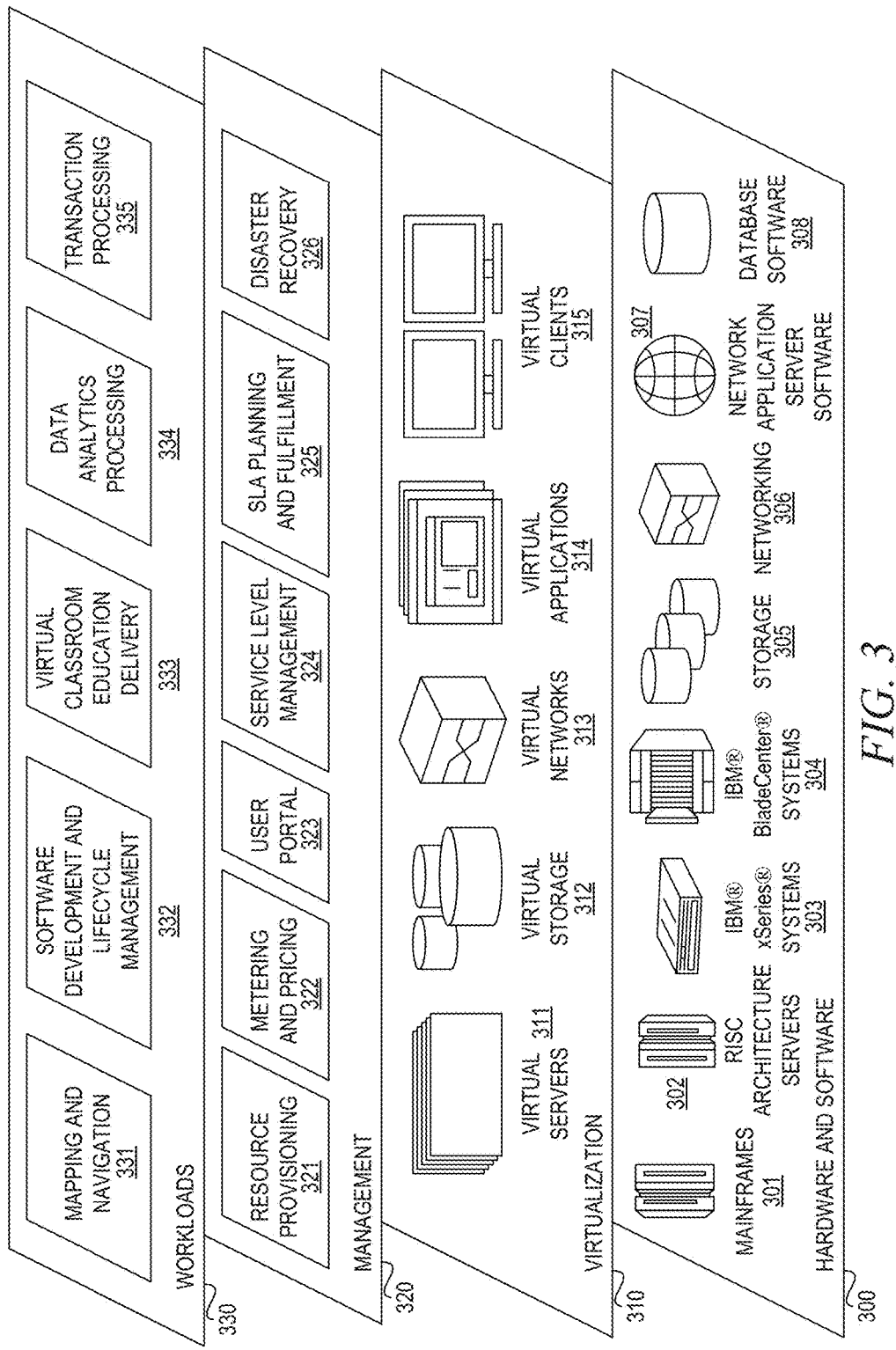
FIG. 3 depicts abstraction model layers according to an illustrative embodiment.

Referring now to FIG. 3, a set of functional abstraction layers provided by a cloud computing environment, such as cloud computing environment 200 of FIG. 2, is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include: mainframes 301; RISC (Reduced Instruction Set Computer) architecture based servers 302; servers 303; blade servers 304; storage devices 305; and networks and networking components 306. In some embodiments, software components include network application server software 307 and database software 308.

Virtualization layer 310 provides an abstraction layer from which the following examples of virtual entities may be provided: virtual servers 311; virtual storage 312; virtual networks 313, including virtual private networks; virtual applications and operating systems 314; and virtual clients 315.

In one example, management layer 320 may provide the functions described below. Resource provisioning 321 provides dynamic procurement of computing resources and other resources that are utilized to perform tasks within the cloud computing environment. Metering and Pricing 322 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 323 provides access to the cloud computing environment for consumers and system administrators. Service level management 324 provides cloud computing resource allocation and management such that required service levels are met. Service Level Agreement (SLA) planning and fulfillment 325 provides pre-arrangement for, and procurement of, cloud computing resources for which a future requirement is anticipated in accordance with an SLA. Disaster recovery 326 provides pre-arrangement for, and procurement of, cloud computing resources for which a future requirement is anticipated in accordance with an SLA. Managed systems disaster recovery 326 may be understood with regard to the following figures.

Workloads layer 330 provides examples of functionality for which the cloud computing environment may be utilized. Examples of workloads and functions which may be provided from this layer include: mapping and navigation 331; software development and lifecycle management 332; virtual classroom education delivery 333; data analytics processing 334; and transaction processing 335.

Figure 4:
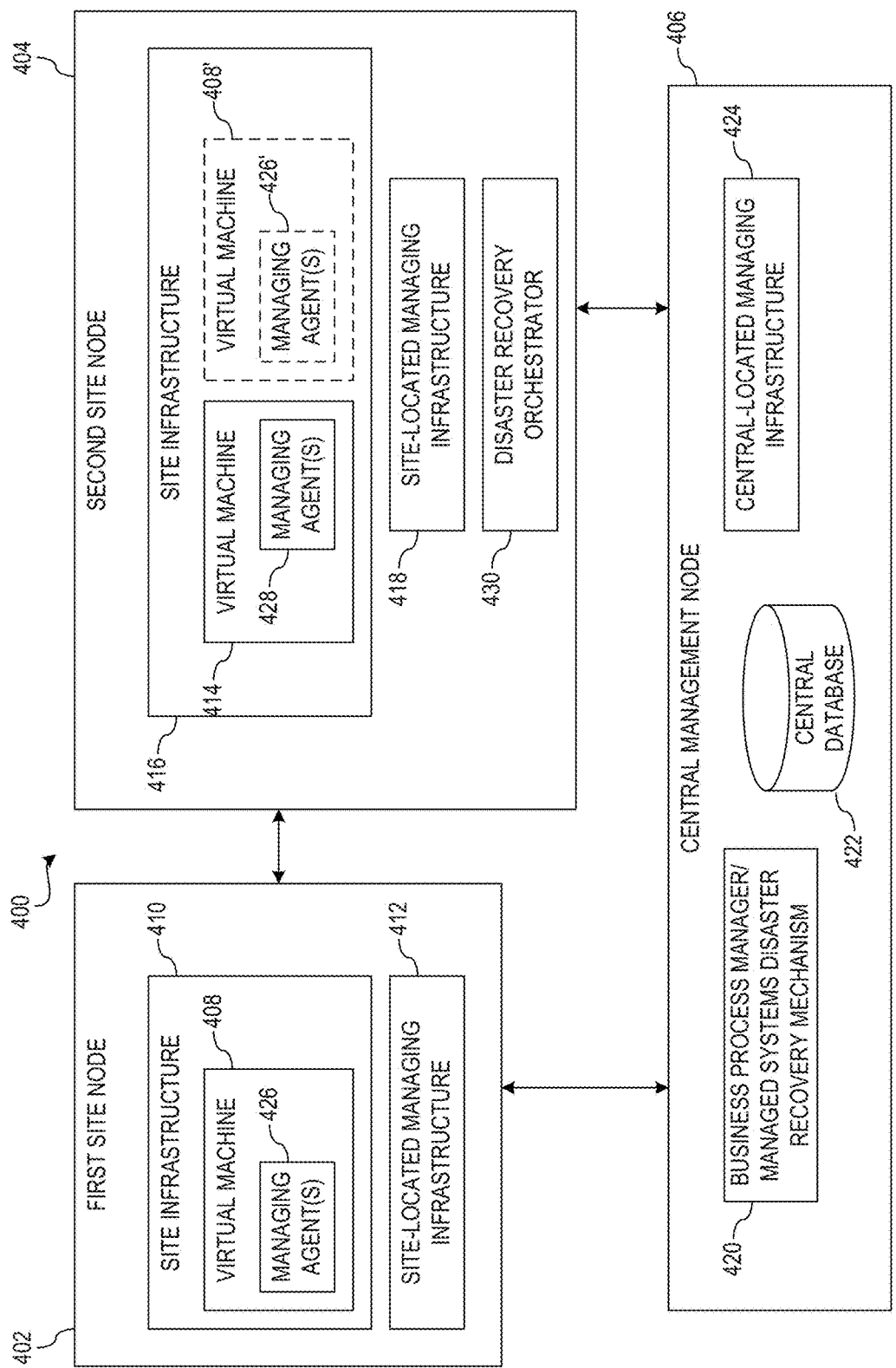
FIG. 4 depicts a functional block diagram of the operation performed by a managed systems disaster recovery mechanism in accordance with an illustrative embodiment.

FIG. 4 depicts a functional block diagram of the operation performed by a managed systems disaster recovery mechanism in accordance with an illustrative embodiment. Data processing system 400, which is a data processing system, such as cloud computing node 100 of FIG. 1, comprises first site node 402, second site node 404, and central management node 406. In accordance with an illustrative embodiment, first site node 402 comprises a virtual machine 408 generated on site infrastructure 410 and site-located managing infrastructure 412 that manages the virtual machines, such as virtual machine 408 within first site node 402. Likewise, second site node 404 comprises a virtual machine 414 generated on site infrastructure 416 and site-located managing infrastructure 418 that manages the virtual machines, such as virtual machine 414 within second site node 404. Central management node 406 comprises a business process manager 420 than manages services orchestration in the central management node 406 as well as on first site node 402 and second site node 404, central database 422 that comprises virtual machine and managing infrastructure metadata, and central-located managing infrastructure 424 that manages virtual machines, such as virtual machine 408 within first site node 402 and virtual machine 414 within second site node 404.

In accordance with the illustrative embodiments, virtual machines 408 and 414 further comprise a set of management agents 426 that act in conjunction with the managing infrastructure that is managing the virtual machines. Thus, for first site node 402, virtual machine 408 comprises managing agents 426 that operate in conjunction with site-located managing infrastructure 412 and central-located managing infrastructure 424. Likewise, for second site node 404, virtual machine 414 comprises managing agents 428 that operate in conjunction with site-located managing infrastructure 418 and central-located managing infrastructure 424.

In accordance with the illustrative embodiments, business process manager 420 is modified to operate as the managed systems disaster recovery mechanism of the illustrative embodiment. When a disaster occurs at a site node, for example first site node 402, disaster recovery orchestrator 430 at second site node 404 receives a declared disaster notification about first site node 402. The notification may be from an administrator or from another site node that monitors the state of first site node 402, such as central management node 406 or second site node 404. Upon receiving the declared disaster notification about the first site node 402, disaster recovery orchestrator 430 sends a request to business process manager 420 requesting metadata for virtual machine 408 that is part of the declared disaster at first site node 402. Business process manager 420 retrieves the metadata associated with virtual machine 408 from central database 422 and returns the retrieved metadata associated with virtual machine 408 to disaster recovery orchestrator 430. Disaster recovery orchestrator 430 then sends a request to site infrastructure 416 to generate virtual machine 408' as well as managing agents 426' using the retrieved metadata associated with virtual machine 408. Upon site infrastructure 416 generating virtual machine 408' and managing agents 426', disaster recovery orchestrator 430 sends an acknowledgement to business process manager 420 that virtual machine 408' and managing agents 426' has been generated as well as, possibly, a request to business process manager 420 requesting a zero-state delta managed service recovery for virtual machine 408'.

That is, business process manager 420 may recognize based on the initial request for metadata for virtual machine 408 that virtual machine 408 is a managed service and thus, would recognize that, once virtual machine 408' is generated, management of virtual machine 408' will be needed. Accordingly, business process manager 420 may only need an acknowledgement from disaster recovery orchestrator 430 to initialize the zero-state managed service recovery for virtual machine 408'. However, business process manager 420 may recognize that receiving the request from disaster recovery orchestrator 430 as part of disaster recovery orchestrator 430 operations and operate with or without the request for zero-state managed service recovery for virtual machine 408'.

The concept of zero-state managed recovery will now be explained. Conventional managed recovery is not zero-state because data defining a metadata/records state data for a VM (sometimes herein simply referred to a "state data" or "state") is stored at one or more sites in the DR system. This metadata/records state data is required for the recovery in order to use a tool available in the DR system. In the case of a non-zero-state DR system, the state data is typically replicated to be locally available at all DR sites in the DR system. Transfers associated with this replication typically incur some RPO>0. This RPO>0 can potentially lead to one or more of the following issues: (i) incurring in some state lose, (ii) complicating the recovery, and/or (iii) not properly reflecting the state of the managed service. In some embodiments of the present invention, managed recovery is zero-state managed recovery because, unlike in conventional managed recovery, there not being state at the disaster site tools related to the VM, which would be required during recovery, because this would be abandoned or lost. In zero-state managed recovery, state data is still required to recover a VM, but there is no state at the DR site related to the VM either. Thus, the notion of zero-state kept as well from the DR site's perspective as well. By design, the state is kept only at a central location and is part of the metadata described in the process that is exchanged between the DRO at site, and the Central repository and Central orchestrator. State data used as well after recovery used by the Central orchestrator to send the state to the Site tools for recovery.

This text describes the "zero-state" concept as in a certain context, where there is no delta, which is which the term "zero-state" is descriptively accurate. The term "zero-state" should not be taken to imply that there is "no state," In some embodiments there will be metadata/records state data associated with each recoverable VM, but no metadata/records state data is replicated across the DR sites, thus no delta. This is why the term "zero-state" is not to be understood as being synonymous with the term "no state," but, rather to mean that the state data is subject to no replication (or at least more limited replication than in conventional DR systems), or "no delta."

In accordance with the illustrative embodiment under discussion, the metadata/records state data associated with a VM includes an identification of one or more of a version of the VM, patches applied to the VM, and other data related to bug fixing. This is because, in this particular example, the metadata/records state data is state data for use with a patching tool available in this embodiment of a DR system. In the embodiment of the invention currently under discussion, managed recovery is zero-state managed recovery because, unlike in conventional managed recovery, of there not being state data related to the VM at the DR sites, which would be required during recovery, because this would be abandoned or lost. In zero-state managed service recovery, state data is still required to recover a VM, but there is no state data replicated or distributed at the DR site related to the VM. By design, the state data is kept only at a central location, such as central management node 406 and is part of the metadata that is exchanged between the disaster recovery orchestrator 430 at second site node 404 and business process manager 420 at central management node 406. State data for the virtual machines may also be used after recovery by central management node 406 for other ones of managing infrastructures that managed the virtual machines.

The metadata/records with the state data for a recovered VM should be understood in the context of related managed service(s). For example, in the context of a given VM and managing infrastructure for the VM, the managing infrastructure would have metadata/records with state data about the VM and current patches applied. As the VM is recovered, managing infrastructure at another site would acquire further metadata/records with state data defining the state of the VM in terms of patches applied and/or maintenance schedule as required at the new DR site. Managed services that may give rise to state type data included in the metadata may include one, or more, of the following: application dependency discovery services, asset discovery services, backup services, endpoint protection services (antivirus), health check services, monitoring services, patch services, security information management services, security hardening services, operating system (OS) customization services (e.g., domain name system (DNS), routing, internet protocol (IP) deployment services, or the like), compliance services, or the like.

Upon acknowledgement from disaster recovery orchestrator 430 that virtual machine 408' and managing agents 426' have been generated as well as, possibly, the request for zero-state managed service recovery for virtual machine 408', business process manager 420 retrieves managing infrastructure metadata, i.e. the zero-state data, for virtual machine 408 from central database 422. Business process manager 420 then sends a request to both site-located managing infrastructure 418 and central-located managing infrastructure 424 to adopt virtual machine 408' as a managed service. Both site-located managing infrastructure 418 and central-located managing infrastructure 424 then individually contact their associated one of managing agents 426' to establish their management of virtual machine 408'. Once the associated ones of managing agents 426' recognize the management by site-located managing infrastructure 418 and central-located managing infrastructure 424, both site-located managing infrastructure 418 and central-located managing infrastructure 424 implement management of virtual machine 408'.

While the above embodiment illustrates a instance where second site node 404 is unaware of virtual machine 408 and generation of virtual machine 408' causes business process manager 420 to initiate management of virtual machine 408' by both site-located managing infrastructure 418 and central-located managing infrastructure 424, there are instance where second site node 404 is aware of virtual machine 408 and/or management of a recovered virtual machine 408' is managed only by site-located managing infrastructure 418 or central-located managing infrastructure 424. In a first example, first site node 402 comprises virtual machine 408 and second site node 404 comprises virtual machine 414. Additionally, site-located managing infrastructure 412 manages virtual machine 408 via managing agent 426 and site-located managing infrastructure 418 manages virtual machine 414 via managing agent 428. In this example, site-located managing infrastructure 412 is unaware of virtual machine 414 and site-located managing infrastructure 418 is unaware of virtual machine 408. When a disaster occurs at first site node 402 and a declared disaster notification is received about first site node 402, disaster recovery orchestrator 430 at second site node 404 recovers virtual machine 408 by obtaining metadata for virtual machine 408 from business process manager 420 and generating virtual machine 408' and managing agents 426' via site infrastructure 416 using the obtained metadata. At this point by using the obtained metadata for virtual machine 408, virtual machine 408' has the same home node (HN) address and internet protocol (IP) address as was utilized on first site node 402. While the HN address will stay the same, the IP address will only be used temporary until the IP address is changed. Furthermore, while managing agents 426' are installed and running, based on the obtained metadata, managing agent's 426' point to site-located managing infrastructure 412, which is also not operable due to the disaster at first site node 402.

To address these issues, business process manager 420 changes the IP in virtual machine 408' to the IP address of second site node 404, which has proper zoning for second site node 404. Business process manager 420 then handles any required domain name system (DNS) updates and operating system (OS) customization. Once business process manager 420 completes these changes, virtual machine 408' is operational but not yet managed. Thus, business process manager 420 retrieves managing infrastructure metadata for virtual machine 408 from central database 422. Business process manager 420 then sends a request to site-located managing infrastructure 418 to adopt virtual machine 408' as a managed service. Site-located managing infrastructure 418 contacts its associated managing agent 426' to establish management of virtual machine 408'. Once the associated managing agent 426' recognizes the management by site-located managing infrastructure 418, site-located managing infrastructure 418 implements management of virtual machine 408'. As should be noted, even though site-located managing infrastructure 418 is now managing virtual machine 408', limited or no changes are required for virtual machine 416 that was already being managed by site-located managing infrastructure 418.

In a second example, first site node 402 comprises virtual machine 408 and second site node 404 comprises virtual machine 414. Additionally, site-located managing infrastructure 412 manages virtual machine 408 via managing agent 426 and site-located managing infrastructure 418 manages virtual machine 414 via managing agent 428. In this example, site-located managing infrastructure 412 is aware of virtual machine 408 and virtual machine 414 and site-located managing infrastructure 418 is aware of virtual machine 414 and virtual machine 408. In this example, when a disaster occurs at first site node 402, because of site-located managing infrastructure's 418 awareness of virtual machine 408, site-located managing infrastructure's 418 reports issues with virtual machine 408 to disaster recovery orchestrator 430.

Disaster recovery orchestrator 430 then recovers virtual machine 408 by obtaining metadata for virtual machine 408 from business process manager 420 and generating virtual machine 408' and managing agents 426' via site infrastructure 416 using the obtained metadata. At this point by using the obtained metadata for virtual machine 408, virtual machine 408' has the same home node (HN) address and internet protocol (IP) address as was utilized on first site node 402. While the HN address will stay the same, the IP address will only be used temporary until the IP address is changed. To ready virtual machine 408' for operation, business process manager 420 changes the IP in virtual machine 408' to the IP address of second site node 404, which has proper zoning for second site node 404. Business process manager 420 then handles any required domain name system (DNS) updates and operating system (OS) customization. Once business process manager 420 completes these changes, virtual machine 408' is operational but not yet managed.

Thus, business process manager 420 retrieves managing infrastructure metadata for virtual machine 408 from central database 422. Business process manager 420 then sends a request to site-located managing infrastructure 418 to adopt virtual machine 408' as a managed service. With the change in IP address, the associated managing agent 426' may lose contact. Thus, site-located managing infrastructure 418 contacts its associated managing agent 426' to re-establish management of virtual machine 408' using the new IP address. Once the associated managing agent 426' recognizes the management by site-located managing infrastructure 418, site-located managing infrastructure 418 implements management of virtual machine 408'. As should be noted, even though site-located managing infrastructure 418 is now managing virtual machine 408', limited or no changes are required for virtual machine 416 that was already being managed by site-located managing infrastructure 418.

In a third example, first site node 402 comprises virtual machine 408 and second site node 404 comprises virtual machine 414. In this example, central-located managing infrastructure 424 manages virtual machine 408 via managing agent 426 and virtual machine 414 via managing agent 428. When a disaster occurs at first site node 402 because of central-located managing infrastructure 424 awareness of virtual machine 408, central-located managing infrastructure 424 reports issues with virtual machine 408 to disaster recovery orchestrator 430. Disaster recovery orchestrator 430 then recovers virtual machine 408 by obtaining metadata for virtual machine 408 from business process manager 420 and generating virtual machine 408' and managing agents 426' via site infrastructure 416 using the obtained metadata. At this point by using the obtained metadata for virtual machine 408, virtual machine 408' has the same home node (HN) address and internet protocol (IP) address as was utilized on first site node 402. While the HN address will stay the same, the IP address will only be used temporary until the IP address is changed.

To ready virtual machine 408' for operation, business process manager 420 changes the IP in virtual machine 408' to the IP address of second site node 404, which has proper zoning for second site node 404. Business process manager 420 then handles any required domain name system (DNS) updates and operating system (OS) customization. Once business process manager 420 completes these changes, virtual machine 408' is operational but not yet managed.

Thus, business process manager 420 retrieves managing infrastructure metadata for virtual machine 408 from central database 422. Business process manager 420 then sends a request to central-located managing infrastructure 424 to adopt virtual machine 408' as a managed service using the new IP address. With the change in IP address, the associated managing agent 426' may lose contact. Thus, central-located managing infrastructure 424 contacts its associated managing agent 426' to re-establish management of virtual machine 408' using the new IP address. Once the associated managing agent 426' recognizes the management by central-located managing infrastructure 424, central-located managing infrastructure 424 implements management of virtual machine 408'. As should be noted, even though site-located managing infrastructure 418 is now managing virtual machine 408', limited or no changes are required for virtual machine 416 that was already being managed by site-located managing infrastructure 418.

In a fourth example, first site node 402 comprises virtual machine 408 and second site node 404 comprises virtual machine 414. In this example, central-located managing infrastructure 424 manages virtual machine 408 via managing agent 426 using site-located managing infrastructure 412 as a relay. Central-located managing infrastructure 424 also manages virtual machine 414 via managing agent 428 using site-located managing infrastructure 418 as a relay. When a disaster occurs at first site node 402 because of central-located managing infrastructure 424 awareness of virtual machine 408, central-located managing infrastructure 424 reports issues with virtual machine 408 to disaster recovery orchestrator 430. Disaster recovery orchestrator 430 then recovers virtual machine 408 by obtaining metadata for virtual machine 408 from business process manager 420 and generating virtual machine 408' and managing agents 426' via site infrastructure 416 using the obtained metadata. At this point by using the obtained metadata for virtual machine 408, virtual machine 408' has the same home node (HN) address and internet protocol (IP) address as was utilized on first site node 402. While the HN address will stay the same, the IP address will only be used temporary until the IP address is changed.

To ready virtual machine 408' for operation, business process manager 420 changes the IP in virtual machine 408' to the IP address of second site node 404, which has proper zoning for second site node 404. Business process manager 420 then handles any required domain name system (DNS) updates and operating system (OS) customization. Once business process manager 420 completes these changes, virtual machine 408' is operational but not yet managed.

Thus, business process manager 420 retrieves managing infrastructure metadata for virtual machine 408 from central database 422. Business process manager 420 then sends a request to central-located managing infrastructure 424 to adopt virtual machine 408' as a managed service using the new IP address. With the change in IP address, the associated managing agent 426' may lose contact. Thus, central-located managing infrastructure 424 contacts its associated managing agent 426' via site-located managing infrastructure 418 to re-establish management of virtual machine 408' using the new IP address. Once the associated managing agent 426' recognizes the management by central-located managing infrastructure 424, central-located managing infrastructure 424 implements management of virtual machine 408' via site-located managing infrastructure 418. As should be noted, even though site-located managing infrastructure 418 is now managing virtual machine 408', limited or no changes are required for virtual machine 416 that was already being managed by site-located managing infrastructure 418.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
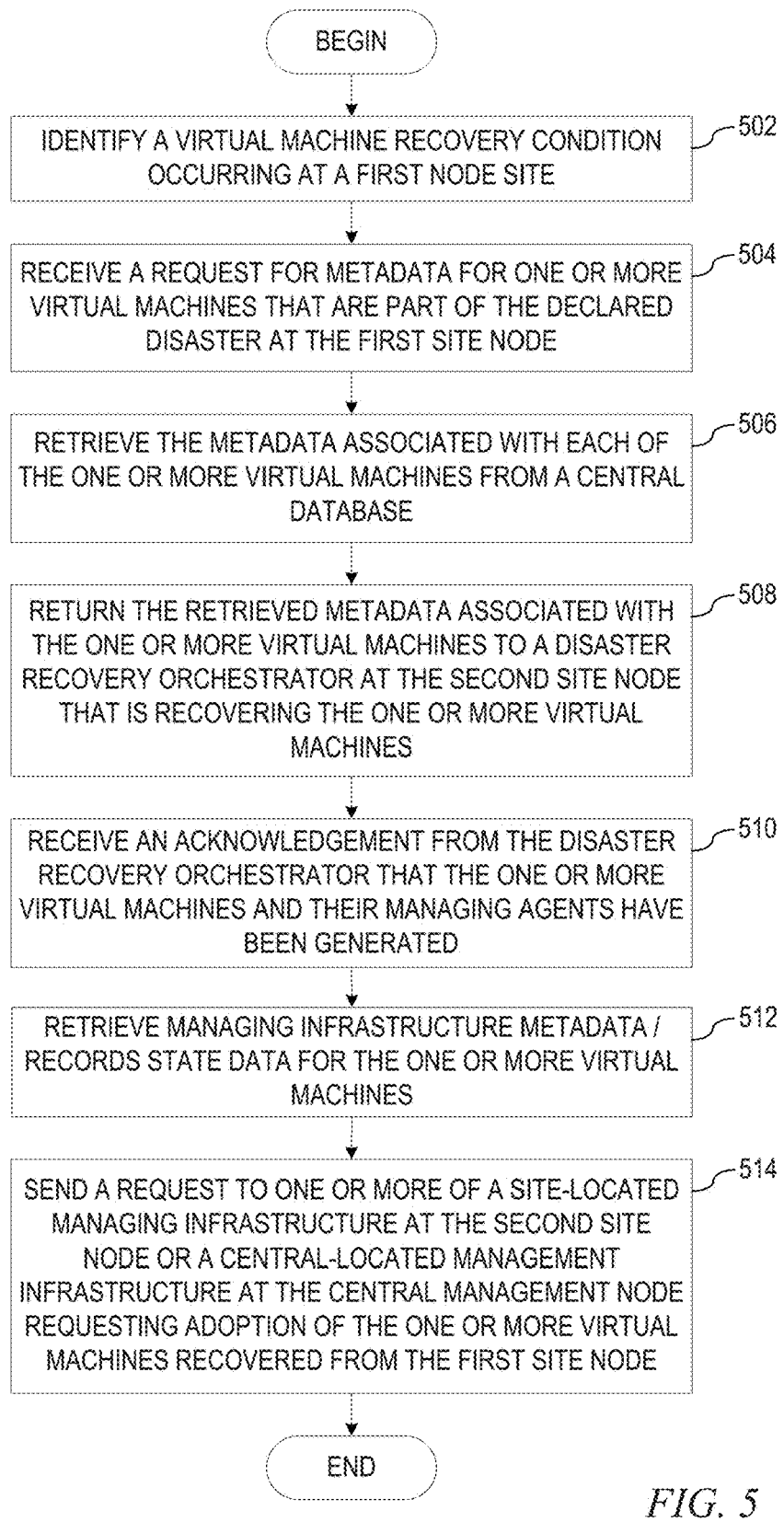
FIG. 5 depicts a flowchart of the operation performed by a managed systems disaster recovery mechanism in accordance with an illustrative embodiment.

FIG. 5 depicts a flowchart of the operation performed by a managed systems disaster recovery mechanism in accordance with an illustrative embodiment. As the operation begins, a managed systems disaster recovery mechanism identifies a virtual machine recovery condition occurring at a first node site (step 502). The identification of the declared disaster at the first site node may be a notification about the first site node made by an administrator, site-located managing infrastructure at a second site node, or central-located managing infrastructure at a central management node. Upon identifying the declared disaster at the first site node, the managed systems disaster recovery mechanism receives a request for metadata for one or more virtual machines that are part of the declared disaster at the first site node (step 504). The managed systems disaster recovery mechanism retrieves the metadata associated with each of the one or more virtual machines from a central database (step 506) and returns the retrieved metadata associated with the one or more virtual machines to a disaster recovery orchestrator at the node, i.e. a second site node that is recovering the one or more virtual machines (step 508). Responsive to receiving the metadata for the one or more virtual machines, the disaster recovery orchestrator at the second site node uses the received metadata to instantiate the one or more virtual machines including any managing agents comprised therein in the site infrastructure at the second site node.

Once the one or more virtual machines and their managing agents are generated, the managed systems disaster recovery mechanism receives an acknowledgement from the disaster recovery orchestrator that the one or more virtual machines and their managing agents have been generated (step 510). The managed systems disaster recovery mechanism then initiates a zero-state managed service recovery for the one or more virtual by retrieving managing infrastructure metadata/records state data for the one or more virtual machines (step 512). The managed systems disaster recovery mechanism sends a request to one or more of a site-located managing infrastructure at the second site node or a central-located managing infrastructure at the central management node (step 514) requesting that one or both of the site-located managing infrastructure at the second site node or the central-located managing infrastructure at the central management node adopt the one or more virtual machines recovered from the first site node. Based on the request, one or both of the site-located managing infrastructure at the second site node or the central-located managing infrastructure at the central management node individually contact an associated one of managing agents within the one or more virtual machines to establish management of each of the one or more virtual machines. Once the associated ones of managing agents recognize the management by one or both of the site-located managing infrastructure at the second site node or the central-located managing infrastructure at the central management node, management of the one or more virtual machines is implemented. The operation ends thereafter.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for disaster recovery of managed systems that do not require pre-disaster provisioning. The managed systems disaster recovery mechanisms integrate a workload that has been replicated to the DR site into the management tools at that DR site at the time of recovery. By integrating the workload into the management tools at that DR site at the time of recovery, a cost advantage is achieved by not having to pre-provision manageable workload at the DR site prior to the disaster, management tool state data does not have to be replicated from the primary site to the DR site prior to the disaster, and full manageability of the failed-over workload at time of disaster is established. Additionally, by integrating the workload into the management tools at that DR site at the time of recovery, the managed systems disaster recovery mechanisms provide for the management tools on the primary site and the DR site to be different, i.e. different products, different technologies, or the like, as well as providing for the DR site management tools to be a subset of the management tools on the primary site.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for disaster recovery of managed systems, the method comprising:
responsive to an identification of a disaster occurring at a first site node requiring recovery of one or more virtual machines, identifying, by a managed systems disaster recovery mechanism at a central management node, the one or more virtual machines to be recovered to a second site node that has not been pre-provisioned with records/metadata state data of the one or more virtual machines;
further responsive to the identification of the disaster occurring at the first site node requiring the recovery of the one or more virtual machines and responsive to the identification of the one or more virtual machines to be recovered, transmitting, by the managed systems disaster recovery mechanism, at least some of the records/metadata state data associated with the one or more virtual machines to the second site node; and
instantiating, at the second site node, a new instantiation respectively for each of the one or more virtual machines using the at least some of the records/metadata state data associated with the one or more virtual machines transmitted to the second site node.

2. The method of claim 1, wherein the transmission of the records/metadata state data includes all of the records/metadata state data required to manage the new instantiations of the one or more virtual machines at the second site node.

3. The method of claim 1, further comprising:
responsive to the new instantiation(s) at the second site node, managing, by one or more managing infrastructures at the second site node, the new instantiation(s) of the one or more virtual machines at the second site node.

4. The method of claim 3, wherein the one or more managing infrastructures is a site-located managing infrastructure at the second site node, wherein the site managing infrastructure contacts an associated managing agent within each of the one or more virtual machines to establish management of each of the one or more virtual machines, and wherein, responsive to the associated managing agent in each of the one or more virtual machines recognizing the site-located managing infrastructure, management of the one or more virtual machines is implemented.

5. The method of claim 1, wherein the identification of the disaster occurring at the first site node is a notification from an administrator.

6. The method of claim 1, wherein the identification of the disaster occurring at the first site node is an identification made by a site-located managing infrastructure at a second site node or a central-located managing infrastructure at a central management node.

7. The method of claim 1, wherein a disaster recovery orchestrator at the second site node generates the new instantiation(s) of the one or more virtual machines as well as any managing agents associated with each virtual machine in the one or more virtual machines.

8. The method of claim 1, wherein managing infrastructure metadata identifies zero-state data for managing the one or more virtual machines not present in one or more managing infrastructures.

9. A computer program product comprising a computer readable storage medium having a computer readable program for disaster recovery of managed systems stored therein, wherein the computer readable program, when executed on a computing device at a central management node, causes the computing device to:
responsive to an identification of a disaster occurring at a first site node requiring recovery of one or more virtual machines, identify the one or more virtual machines to be recovered to a second site node that has not been pre-provisioned with records/metadata state data of the one or more virtual machines;
further responsive to the identification of the disaster occurring at the first site node requiring the recovery of the one or more virtual machines and responsive to the identification of the one or more virtual machines to be recovered, transmit at least some of the records/metadata state data associated with the one or more virtual machines to the second site node; and
instantiate, at the second site node, a new instantiation respectively for each of the one or more virtual machines using the at least some of the records/metadata state data associated with the one or more virtual machines transmitted to the second site node.

10. The computer program product of claim 9, wherein the transmission of the records/metadata state data includes all of the records/metadata state data required to manage the new instantiation(s) of the one or more virtual machines at the second site node.

11. The computer program product of claim 9, wherein the computer readable program further causes the computing device to:
responsive to the new instantiation(s) at the second site node, manage, by one or more managing infrastructures at the second site node, the new instantiation(s) of the one or more virtual machines at the second site node.

12. The computer program product of claim 11, wherein the one or more managing infrastructures is a site-located managing infrastructure at the second site node, wherein the site-located managing infrastructure contacts an associated managing agent within each of the one or more virtual machines to establish management of each of the one or more virtual machines, and wherein, responsive to the associated managing agent in each of the one or more virtual machines recognizing the site-located managing infrastructure, management of the one or more virtual machines is implemented.

13. The computer program product of claim 9, wherein a disaster recovery orchestrator at the second site node generates the new instantiation(s) of the one or more virtual machines as well as any managing agents associated with each virtual machine in the one or more virtual machines.

14. The computer program product of claim 9, wherein managing infrastructure metadata identifies zero-state data for managing the one or more virtual machines not present in one or more managing infrastructures.

15. An apparatus at a central management node for disaster recovery of managed systems comprising:
a processor; and
a memory coupled to the processor, wherein the memory comprises instructions which, when executed by the processor, cause the processor to:

responsive to an identification of a virtual disaster occurring at a first site node requiring recovery of one or more virtual machines, identify the one or more virtual machines to be recovered to a second site node that has not been pre-provisioned with records/metadata state data of the one or more virtual machines;

further responsive to the identification of the disaster occurring at the first site node requiring the recovery of the one or more virtual machines and responsive to the identification of the one or more virtual machines to be recovered, transmit at least some of the records/metadata state data associated with the one or more virtual machines to the second site node; and instantiate, at the second site node, a new instantiation respectively for each of the one or more virtual machines using the at least some of the records/metadata state data associated with the one or more virtual machines transmitted to the second site node.

16. The apparatus of claim 15, wherein the transmission of the records/metadata state data includes all of the records/metadata state data required to manage the new instantiation(s) of the one or more virtual machines at the second site node.

17. The apparatus of claim 15, wherein the instructions further cause the processor to;

responsive to the new instantiation(s) at the second site node, manage, by one or more managing infrastructures at the second site node, the new instantiation(s) of the one or more virtual machines at the second site node.

18. The apparatus of claim 17, wherein the one or more managing infrastructures is a site-located managing infrastructure at the second site node, wherein the site-located managing infrastructure contacts an associated managing agent within each of the one or more virtual machines to establish management of each of the one or more virtual machines, and wherein, responsive to the associated managing agent in each of the one or more virtual machines recognizing the site-located managing infrastructure, management of the one or more virtual machines is implemented.

19. The apparatus of claim 15, wherein a disaster recovery orchestrator at the second site node generates the new instantiation(s) of the one or more virtual machines as well as any managing agents associated with each virtual machine in the one or more virtual machines.

20. The apparatus of claim 15, wherein managing infrastructure metadata identifies zero-state data for managing the one or more virtual machines not present in one or more managing infrastructures.

* * * * *